April 20, 1937. J. C. CROWLEY 2,078,063
VALVE STEM
Filed April 17, 1934
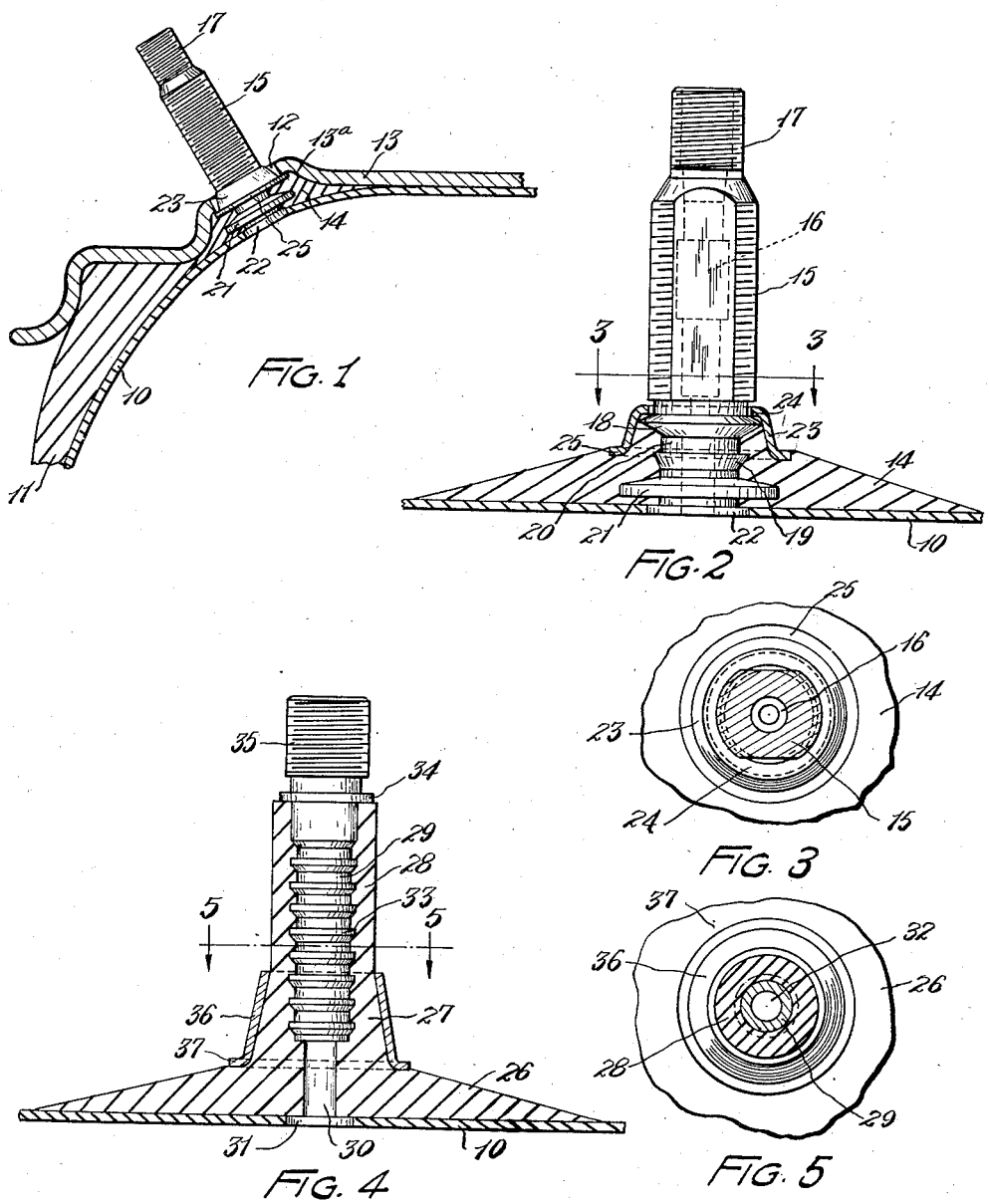
INVENTOR
JOHN C. CROWLEY,
Kwis Hudson & Kent
ATTORNEYS

UNITED STATES PATENT OFFICE 2,078,063

VALVE STEM

John C. Crowley, Cleveland Heights, Ohio, assignor to The Dill Manufacturing Company, Cleveland, Ohio, a corporation of Ohio Application April 17, 1934, Serial No. 720,992

2 Claims. (Cl. 152—12)

This invention relates to a valve stem such as is used on pneumatic tires.

It has been customary to provide metal valve stems for pneumatic tires with heads at the inner end of the stems and located within the tire tubes, while the stems extend outwardly through openings in the tubes. In order to strengthen the tire tubes at the point of attachment of the stems, reenforcing patches usually are vulcanized to the tubes at such points. The stems are held in position in the tire tubes by means of spreader plates arranged on the stems and engaging the outside of the tubes, nuts screwed down on the externally threaded stems serving to clamp the tubes between the heads and the spreader plates.

This form of valve stem construction is open to the objection that the mechanical connection between the stem and tire tube does not form an efficient air-tight seal and leaks frequently occur at the point of connection. Also, the mechanical connection requires the use of a number of separate parts such as the spreader plate, clamping nut, and other parts.

An object of the invention is to provide a valve stem, either metal or rubber, which is integrally united to the tire tube by being vulcanized thereto, thus obviating the likelihood of leaks at the point of connection and the use of a number of separate parts.

In the use of rubber valve stems or valve stems partially constructed of rubber, the opening for the stem in the tire rim becomes sealed by the rubber of the stem packing into and around the opening, with the result that when the tire tube is inflated the air between the tube and the tire casing and rim cannot escape through the opening and will be trapped between the tube and tire rim and casing.

Another object of the invention is to provide a valve stem construction applicable to stems constructed entirely or partially of rubber and of such character that the rim opening will not be sealed air-tight by the stem and the air between the tube and the tire casing and rim will be free to escape as the tube is inflated.

Another object of the invention is to provide a valve stem construction such that the stem will be properly centered in the rim opening.

It frequently occurs that valve stems having rubber portions on the parts of the stems that extend through the rim openings do not properly fit the openings and it is necessary to file the periphery of the opening to increase the size thereof, so as to permit the stems to be pulled therethrough. Also, the type of valve stem just referred to has the disadvantage that the edge of the rim at the opening cuts into the rubber of the stem and seriously damages the same and, in fact, often renders the stem useless.

A further object of the present invention is to provide a valve stem construction such that it will be substantially unnecessary to file the rim opening when inserting the stem therethrough and also such that the edge of the rim at the opening will not injure or cut the stem proper.

Further and additional objects and advantages will become apparent hereinafter during the detailed description which is to follow of two embodiments of the invention that are illustrated in the accompanying drawing, wherein Figure 1 is a fragmentary sectional view through a tire casing, tube and rim and shows the base of the valve stem embodying one form of the invention in section, while the stem itself is shown in elevation.

Fig. 2 is an enlarged view of the form shown in Fig. 1, the rim and casing being omitted.

Fig. 3 is a sectional view taken substantially on line 3—3 of Fig. 2, looking in the direction of the arrows.

Fig. 4 is an enlarged sectional view through a different form of the invention from that shown in Figs. 1-3, inclusive, and Fig. 5 is a sectional view taken substantially on line 5—5 of Fig. 4, looking in the direction of the arrows.

In Fig. 1 the valve stem is illustrated as carried by a tire tube 10 arranged in a casing 11, which stein extends outwardly through the opening 12 in the rim 13 and toward the outer side of the wheel which carries the rim.

The valve stem comprises a base 14 formed of rubber and somewhat conical in shape in that it is of increasing thickness toward its center. The base 14 is vulcanized to the tube 10 and in effect becomes an integral part thereof and actually serves as a reenforcement for the tube at the point where the stem is attached thereto.

A stem 15 formed of suitable metal and having a bore 16 extending therethrough and of such shape as to receive therein the usual valve insides is secured to the base as will later be explained. The bore 16, as is customary, is threaded within a reduced nipple 17 at the outer end of the stem to receive the threaded plug of a valve insides, while the stem and the reduced nipple are externally threaded so that suitable dust or valve caps can be mounted thereon, as desired.

The stem 15 adjacent its lower end is provided with a laterally extending annular projection 18, the opposite sides of which are outwardly convergent and form inclined seats. Below the annular projection 18 the stem is provided with a second annular and lateral projection 19 which has its outer circumference downwardly inclined toward the stem, while its upper side extends substantially perpendicular to the stem and forms with the projection 18 an annular groove 20 therebetween. Below the projection 19 the stem is further provided with another annular and lateral projection 21 that extends outwardly beyond the circumference of the projection 18, the upper surface of the projection 21 being outwardly and downwardly inclined, as viewed in the drawing. At the extreme inner end of the stem there is still another annular and lateral projection 22 that extends outwardly a shorter distance than either of the projections 18 and 21. The lower side of the projection 21 and the upper side of the projection 22 define an annular groove therebetween.

The rubber base 14 is mounted on the lower end of the stem with its inner surface flush with the upper side of the projection 22 and with portions of the base extending into the groove 20 between the projections 18 and 19, into the groove between the projections 19 and 21 and into the groove between the projections 21 and 22. It will be noted that the manner in which the base extends into the grooves between the projections of the stem and the manner in which the projections extend into the base provide a secure interlock between the stem and base, whereby the base and stem may be securely vulcanized together.

An upwardly and inwardly tapered metal ring 23 is mounted on the stem and base and has at its upper end an inturned annular flange 24 the inner and lower edge of which bears upon the upper downwardly inclined side of the projection 18 and has at its lower end an outwardly extending annular flange 25 which is countersunk into the base 14, it being noted that the outer edge of the projection 18 engages the inner side of the ring between the flanges 24 and 25.

The rubber base is vulcanized to the stem and ring and the structure in effect becomes one integral device. It will be noted that the ring 23 by extending outwardly and downwardly allows a substantial portion of the base 14 to be received and locked between it and the stem, thus further increasing the security of the connection between the stem and base.

The stem and base are positioned upon and vulcanized to the tube 10 with the projection 22 of the stem located in an opening in the tube, the inner surface of the tube being illustrated as substantially flush with the inner surface of the projection 22. When the stem and base are vulcanized to the tube it becomes in effect an integral part of the tube and there is no possibility of an air leak occurring at the point of connection of the stem with the tube, while the relatively thick base 14 of the stem acts as a reenforcement for the tube at this point, which fact is of considerable importance inasmuch as tire tubes are subjected to the greatest strains at the points where the valve stems are connected thereto.

When the tube with the stem thereon is arranged in the casing 11 and mounted on the rim 13 the stem will extend through the rim opening 12. When the tube is inflated the base 14 will extend into and substantially fill the recessed portion 13a of the rim beneath the rim opening 12. While the ring 23 will lie in the opening and center the valve stem, it being noted that the tapered or conical formation of the ring compensates for variations in the size of the rim opening. Inasmuch as the ring 23 and its flange 25 provides a metal to metal contact between it and the rim 13, the opening 12 will not be sealed air-tight as is the case when a rubber stem extends therethrough and such air as is trapped between the tube 10 and the casing 11 and rim 13 when the tube is inflated may readily escape. Also since the ring 23 is tapered the stem, in case the tube is punctured and becomes deflated, may swing sufficiently to permit it to be pulled through the opening, thus obviating likelihood of the stem being pulled out of the tube.

Although the ring 23 permits the escape of air trapped between the rim, casing and tire tube and also provides for sufficient lateral movement of the stem in case of deflation of the tube to allow it to pull through the opening it will readily be seen that the ring 23 forms a sufficient seal against the entrance of dirt and other foreign matter through the opening 12.

Another important feature of the construction just described, as reference to Figs. 1 and 2 will indicate, is that the inner side of the ring 23 engages the projection 18, while the flange 25 engages the inner side of the tire rim adjacent the opening 12. It will be seen that the ring 23 takes all the thrust placed on the base of the stem by the air pressure in the tire and prevents the rubber of the base between the stem and the ring from being compressed after the tire is inflated.

In the form of the invention shown in Figs. 4 and 5 the valve stem is illustrated as a rubber stem provided with a metal insert which receives the valve insides and can have screwed thereon the valve or dust cap.

The base 26 of the stem is similar to the base 14 in the previously described form in that it increases in thickness towards its central point and is vulcanized to the tube 10. The base 26 at its center point is provided with an upwardly extending conical portion 27 from which extends a cylindrical portion 28. The base and the portions 27 and 28 are integrally formed of rubber and there is in the portions 27 and 28 a bore into which extends the metal insert 29, while a reduced bore 30 extends through the base and into the portion 27 and communicates with the opening 31 in the tire tube and the lower end of the bore 32 in the metal insert 29 which receives the valve insides.

The insert 29 is provided with a plurality of annular and lateral projections 33 which extend into the material of the portions 27 and 28 and provide, together with the recesses between the projections, means for securely anchoring the insert in the rubber stem, particularly after the stem is vulcanized to the insert. The insert is provided with an annular flange 34 adjacent its upper end which bears against the outer end of the portion 28 and the insert also has at its outer end an exteriorly threaded portion 35 upon which a valve cap may be screwed.

A conical metal ring 36 fits upon the conical portion 27 of the rubber stem and has at its lower end an outturned annular flange 37 that bears upon the base 26 at the lower end of the conical portion 27. The rubber stem is vulcanized to the ring 36, as well as to the insert 29, and the construction after such vulcanization becomes in effect an integral device that can be applied and vulcanized to the tire tube 10 so as to be integrally connected to the tube.

In the form of the invention just described the ring 36 serves the same functions as does the ring 23 in the first described form in that it centers the stem in the rim opening, provides a metal to metal contact between the stem and the edge of the rim opening thus obviating danger of sealing the rim opening whereby the air between the tube, casing and rim may escape when the tube is inflated and also permits of sufficient lateral movement of the stem when the tube is deflated to allow the stem to pull through the rim opening. In addition to these functions the ring 36 prevents the edge of the rim opening from cutting into and wearing the rubber stem as now happens with the rubber stems in use at the present time.

The ring 36 further serves to reenforce the rubber stem and hold the same against bulging outwardly when the tube is inflated. The ordinary rubber stem possesses the disadvantage that under the pressure of the air in the tube there is a tendency for the stem to bulge outwardly adjacent the rim opening, thus further increasing the likelihood of the stem being cut and injured by the rim and also aggravating the sealing action of the stem in the rim opening. As above stated, the present invention eliminates these disadvantages.

Although two preferred embodiments of the invention have been illustrated and described herein, it will be understood that the invention is susceptible of various modifications and adaptations within the scope of the appended claims.

Having thus described my invention, I claim:

1. A valve stem comprising a rubber base adapted to be vulcanized to a tire tube, a metal stem secured to said base and adapted to extend through the usual rim opening, said stem having a laterally projecting portion, and a conical rigid ring secured to said stem and base and engaging said projecting portion of the stem, said ring having a flange engaging said base and adapted to contact with the inner side of the rim whereby any thrust placed on the base by the air pressure will be taken by the ring.

2. A valve stem comprising a rubber base, a metal stem secured to the base and having laterally extending portions one of which is above the base and another of which is embedded in the base, and a rigid conical ring arranged on said stem and base having its small end inturned and engaging the first mentioned laterally extending portion and its large end outturned and in engagement with the outer side of said base, said ring confining a portion of said base between it and a part of the stem.

JOHN C. CROWLEY.